United States Patent [19]

Acosta

[11] 4,135,753

[45] Jan. 23, 1979

[54] PLUMB BOB RETRIEVER

[76] Inventor: Adam Acosta, 10260 Bronstein Pl., San Diego, Calif. 92124

[21] Appl. No.: 846,883

[22] Filed: Oct. 31, 1977

Related U.S. Application Data

[63] Continuation-in-part of Ser. No. 787,207, Apr. 13, 1977, abandoned.

[51] Int. Cl.² .............................................. B25J 1/02
[52] U.S. Cl. ..................................... 294/115; 294/116
[58] Field of Search ......................... 294/19 R, 20–22, 294/50.8, 50.9, 86.26, 100, 115, 116; 15/104.3 R, 104.3 G, 104.3 SN; 81/385, 386, 389, 392, 398, 399

[56] References Cited

U.S. PATENT DOCUMENTS

| 182,367 | 9/1876 | Jones | 294/50.8 |
| 1,787,112 | 12/1930 | King | 294/115 X |
| 1,961,421 | 6/1934 | Hogenson | 294/115 |
| 2,246,056 | 6/1941 | McKenzie | 294/100 X |
| 2,320,967 | 6/1943 | Dunkelberger | 294/100 |
| 3,482,868 | 12/1969 | Witt | 294/50.9 |

Primary Examiner—Johnny D. Cherry
Attorney, Agent, or Firm—Ralph S. Branscomb

[57] ABSTRACT

The invention comprises a retrieving instrument featuring a snap-lock handle connected to one end of a Bowden wire type cable, the other end of which has a gripping head with jaws operated by the core cable to grip an object, the handle being such that once it is closed and the jaws gripped around an object, they automatically lock into the gripping mode until released.

2 Claims, 4 Drawing Figures

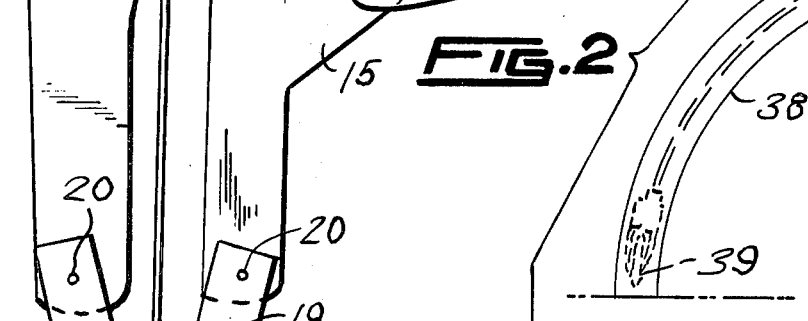
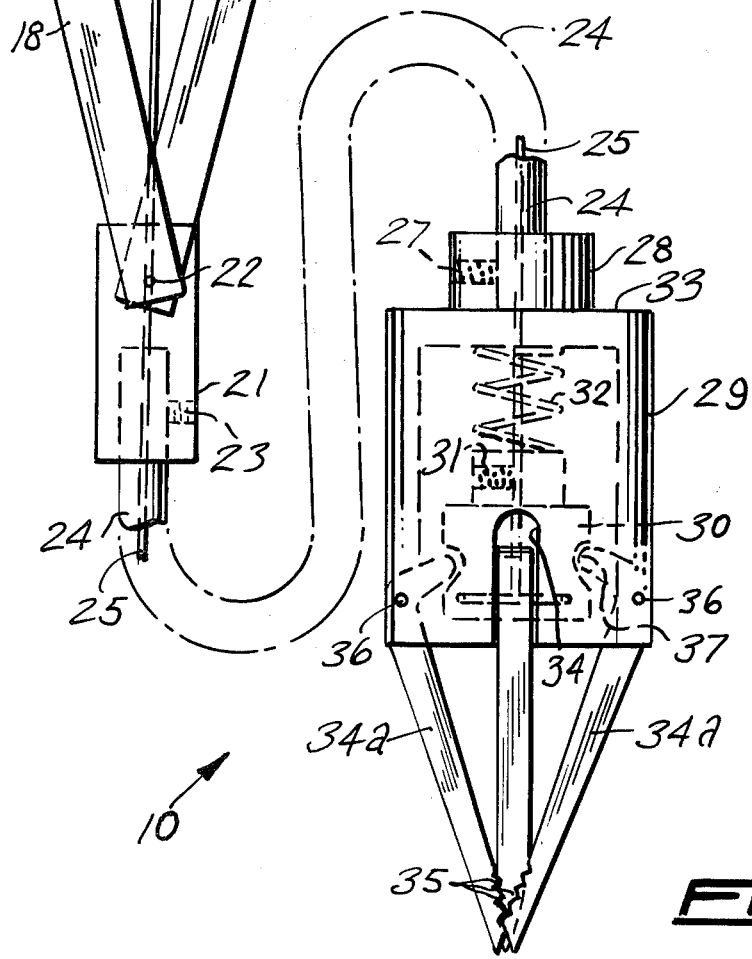
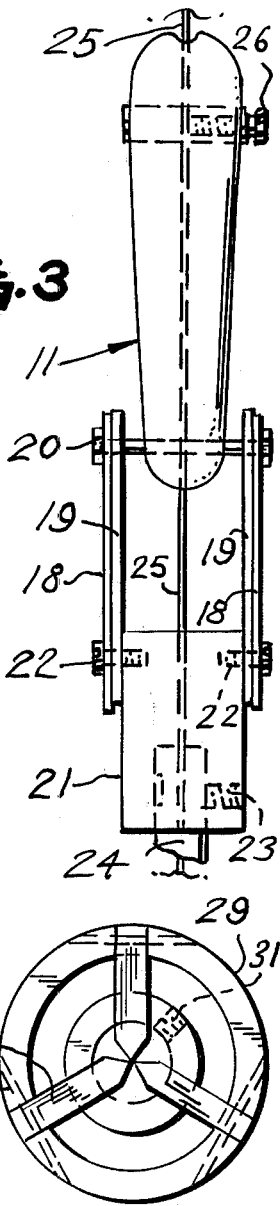

PLUMB BOB RETRIEVER

The present application is a continuation-in-part of application Ser. No. 787,207 filed Apr. 13, 1977, now abandoned.

BACKGROUND OF THE INVENTION

The invention is a retrieving device which was designed toward the specific needs of ships. Many of these ships have fuel tanks having no other means of determining the amount of fuel contained therein other than a long pipe extending into and down to the bottom of the tank a distance of as much as 50 or 60 feet. This pipe is provided with openings which permit the fuel to enter the pipe, and the fuel level is measured by dropping a plumb bob on the end of a measuring tape to the bottom of the tank and retrieving it to determine the fuel level on the measuring.

This method is primitive but seemingly not subject to failure. However, it is a relatively frequent occurrence that the plumb bob breaks the tape and is lodged at the bottom of the measuring pipe. Sometimes even more than one plumb bob will accumulate in the bottom of a measuring pipe with the obvious result that someone measuring the fluid level will underestimate the amount of fuel which will result in overfilling the tank and spilling the excess, which may be considerable, into the sea.

The device of the present invention is a retriever which is designed particularly toward the retrieval of lost plumb bobs but is clearly adaptable to other uses as well.

SUMMARY OF THE INVENTION

The instant retriever utilizes a hand grip mechanism popularized under the trademark Vise Grip and characterized by an automatic locking action which occurs upon squeezing the handle together. This handle device is connected to a Bowden type wire having an incompressible external sheath containing an axially sliding core cable having at the distal end a gripping head with several jaws operated by the Bowden cable to grip a plumb bob so that it may be retrieved. A special coupling assembly which connects the gripping handle to the Bowden wire multiplies the leveraging and locking action of the handle, and the head is made so that not only are the individual jaw elements replaceable by simply removing a pin (a jaw element could be machined and installed aboard ship), but also the entire gripping head is easily removeable and replaceable by a different type or size of head to invest the unit with a great deal of flexibility.

BRIEF DESCRIPTION OF THE DRAWINGS

FIG. 1 is a side elevation view of the instrument showing portions in phantom;

FIG. 2 is a diagrammatic view of the lower portion of the device extended down a measuring pipe or two;

FIG. 3 is a fragmentary left end view of FIG. 1; and

FIG. 4 is a bottom plan view of the jaw and sleeve portion of FIG. 1.

DETAILED DESCRIPTION OF THE PREFERRED EMBODIMENT

The implement is indicated generally by the numeral 10 and has a handle comprised of a base member 11 and a squeeze lever 12. The squeeze lever 12 cooperates with an over-the-center brace 14, a pivotal member 15, and an extension spring 16 to achieve an action which was popularized by Vise Grip pliers. This action is characterized by its over-the-center feature in which as the squeeze lever 12 approaches the base member 11 such that the pivot point between the brace 14 and the squeeze lever 12 passes a certain point, the handle snaps together and locks the jaws. The point at which this occurs can be varied by adjusting the screw 17 in the base member, and release of the handle once it is locked is accomplished by depressing release lever 13.

This handle is connected to a Bowden wire coupling which includes a pair of levers 18 and a pair of levers 19 which are pivoted by pins 20 or the like to the base member and pivot arm 15. The lower ends of these levers are co-axially pivoted to the sides of seating sleeve 21 by a common pin 22.

A set screw 23 is utilized to firmly secure the flexible but axially incompressible sheath 24 of the Bowden wire assembly into a seat in the coupling sleeve 21. The core wire 25, which is inextensible but freely slidable within the flexible sheath 24, passes freely through a bore in the sleeve 21 to be anchored in the base member 11 by a set screw 26 as can best be seen in FIG. 3. This set screw permits the sliding out and removal of the core wire 25 in a simple fashion in the event that the gripping head need be removed or replaced.

The Bowden wire enters the gripping head wherein the outer sheath 24 is secured by a set screw 27 in a shoulder 28 which is an integral part of a casing 29. The core cable 25 extends through this shoulder and into an open space defined interiorally of the casing 29 and inside a plunger 30, to which it is secured by means of a set screw 31 seated in a bore in a shoulder of the plunger. This shoulder also provides a face which compresses a coil spring 32 against the rear end wall 33 of the housing 29. This urges the plunger downward and causes the jaw elements to open as will be understood hereinafter.

The open front end of the casing 29 is provided with several slots 34 and in each of these slots a jaw element 34a having gripping teeth 35 is inserted. These jaw elements are each pivoted on a pin 36 which passes through a somewhat tangential bore provided in the casing 29 as is best seen in FIG. 4.

The operation of the jaw elements 34a is accomplished by axial movement of the plunger 30 which has an annular groove in which cam arms 37 extending from the jaw elements seat. It can be visualized from FIG. 1 that as the plunger moves to and fro the jaw elements are caused to expand and contract by means of the action of the plunger on these cam arms 37.

OPERATION

FIG. 2 illustrates diagrammatically the operation of the implement. A fuel checking tube 38 of the type characteristically found in the fuel tank of large vessels is shown, and in the bottom of this pipe or tube 38 a plumb bob 39 rests which has broken off of its retaining measuring line. Ordinarily the outside diameter of the cylindrical casing 29 would fit within the pipe 38 fairly snugly but without binding, and as the jaw elements 34a are expanded they define an extension of the casing 29, and it is easily seen that as they expand somewhat beyond the straight out position, they brush against the interior of the fuel tube and will slip around the lost plumb bob very easily.

Once it is felt that the gripping head is as far down the tube as it will go, the handle is squeezed closed and it snaps into its locked position, where it stays automatically until released. While the handle is so locked, the Bowden wire is retracted from the tube and the plumb bob retrieved.

Several features of the mechanics of the device should be noted. First of all, because the locking mechanism is on the handle, the maximum degree of play, which is naturally inherent in the slightly compressible sheath and slightly extendable core cable, is incorporated in the device to provide a springy, or forgiving, feature so that unnecessary force would not be delivered to the head mechanism. If this play becomes too great, the slack is easily taken out by simply adjusting the set screw 17, or for more major adjustments set screw 26 can be used to withdraw a length of the core cable 25.

The pivoted lever arms 18 and 19, in addition to orienting the forces to axially displace the core cable, also have the affect of greatly increasing the leverage of the handle over the Bowden wire the closer the lever arms become. The affect of this is first of all to insure a very firm gripping action at the gripping head, but also this action enables the handle to operate under a very slight pressure when it is at or near its locking mode. This makes the device very easy to operate and easy to unlock with or without the release lever 13.

Other features of the invention include easy replaceability of the individual jaw elements 34a by driving out retaining pins 36. Also, the entire gripping head can be removed in favor of a different type or size (some ships use a somewhat larger fuel testing tube) by releasing set screw 26, which unfastens the core cable 25 and permits the exit of the plunger 30 from the casing 29 so that the set screw 31 can be loosened to release the front end of the cable. Set screw 27 is then released and the entire head removed, and of course another head type or size can be equally easily put in the first head's place. It should also be noted that other than three jaw elements 34a could be used in this, or another, gripping head.

Thus a tool of multiple mechanically advantageous features as well as flexility and adaptability is shown. When devoted toward the particular use for which the instrument was designed, a tremendous amount of effort on behalf of the ship's crew is saved. Previously, regulations require that after the fuel tanks have been evacuated (two hour or so process), that they be aired for 24 hours, subsequent to which a couple of men must spend a couple of hours evacuating vapors and getting to the plumb bob to retrieve same.

I claim:

1. A retrieving instrument comprising:
   a. A squeeze-action handle having a base member and a squeeze lever member and an over-the-center mechanism causing said base member and squeeze lever member to lock together upon being sufficiently compressed;
   b. Said over-the-center mechanism including a brace pivoted at one end to said squeeze lever member and longitudinally buttressed at the other end by an adjusting screw threaded into said base member, whereby the degree of compression at which point said handle locks is variable to vary the force of said jaws on an object gripped thereby;
   c. a Bowden wire device comprising:
      i. a flexible substantially axially incompressible outer sheath;
      ii. a substantially inextensible cable axially movable within said sheath;
   d. coupling means connected to said handle and one end of said Bowden wire device for effective relative axial motion between said sheath and cable in response to the squeezing of said handle;
   e. a gripping head mounted on the other end of said Bowden wire device and having movable gripping jaws operative between open and closed positions by operating said handle, whereby upon said members being sufficiently compressed, said jaws grip and lock on an object place therebetween.

2. An instrument according to claim 1 wherein said coupling means includes a mounting sleeve for said Bowden wire device which captures said sheath and passes said cable through to a mounting on said base member, and further including a pair of levers pivotally mounted on said sleeve and having free ends pivotally coupled to said base member and squeeze lever member, respectively, such that compressing said levers together forces said sleeve along said cable with a leveraging action which increases with increased mutual proximity of said levers.

* * * * *